US007695283B2

(12) United States Patent
Buhrman

(10) Patent No.: US 7,695,283 B2
(45) Date of Patent: Apr. 13, 2010

(54) VISUAL ARITHMETIC TEACHING DEVICE

(76) Inventor: Gary Buhrman, 2518 Bopp Rd., St. Louis, MO (US) 63131-3217

( * ) Notice: Subject to any disclaimer, the term of this patent is extended or adjusted under 35 U.S.C. 154(b) by 704 days.

(21) Appl. No.: 11/503,705

(22) Filed: Aug. 14, 2006

(65) Prior Publication Data

US 2008/0050705 A1 Feb. 28, 2008

(51) Int. Cl.
*G09B 1/00* (2006.01)

(52) U.S. Cl. ....................... 434/195; 434/191

(58) Field of Classification Search ............... 434/188, 434/194, 195, 196, 200, 205, 208, 191; 446/433, 446/444, 446
See application file for complete search history.

(56) References Cited

U.S. PATENT DOCUMENTS

| | | | | |
|---|---|---|---|---|
| 1,471,437 A | * | 10/1923 | Wood | 434/195 |
| 2,835,988 A | * | 5/1958 | Henry | 434/195 |
| 3,094,792 A | * | 6/1963 | Morgan et al. | 434/195 |
| 3,229,388 A | * | 1/1966 | Smith | 434/195 |
| 3,900,960 A | * | 8/1975 | Hollywood | 434/195 |
| 4,697,812 A | * | 10/1987 | Rudell et al. | 104/305 |
| 5,137,452 A | | 8/1992 | Pollock | |
| 5,176,577 A | | 1/1993 | Pollock | |
| 5,238,407 A | | 8/1993 | Pollock | |
| 5,238,408 A | | 8/1993 | Pollock | |
| 5,297,965 A | * | 3/1994 | Manancero | 434/195 |
| 5,421,732 A | * | 6/1995 | Taylor | 434/195 |
| 5,554,062 A | | 9/1996 | Goldsen | |
| 5,597,308 A | * | 1/1997 | Woldenberg et al. | 434/196 |
| 5,683,252 A | * | 11/1997 | Tsao | 434/195 |
| 5,803,743 A | | 9/1998 | Kaufman | |
| 5,967,787 A | * | 10/1999 | Tsao | 434/208 |
| 6,575,754 B2 | * | 6/2003 | Salvo | 434/195 |
| 6,758,675 B2 | * | 7/2004 | Karabaic | 434/189 |

OTHER PUBLICATIONS

School Speciality Publishing—Overhead Base Ten Blocks www.schoolspecialtypublishing.com/products/1564518078.php Printed Oct. 30, 2006.

* cited by examiner

*Primary Examiner*—Kurt Fernstrom
(74) *Attorney, Agent, or Firm*—Polster, Lieder, Woodruff & Lucchesi, L.C.

(57) ABSTRACT

An educational device is provided which can be used to teach arithmetic. The educational device comprises a track having a scale on an outer surface of said track. The scale is comprised of a plurality of evenly spaced apart unit markings, the markings being spaced apart by a unit length. Blocks are provided which are slidingly received on the track. Each block has a length based on the unit length, and indicium is provided on the each block to identify the length of the block in unit lengths. When a set of blocks is positioned on the track, the end of the last block will line up with a unit marking on the scale representing the overall length of the set of blocks in "units", and hence showing the sum of the lengths of the set of blocks placed on the track. By adding and removing blocks to the track, addition and subtraction "facts" can be visually taught.

23 Claims, 5 Drawing Sheets

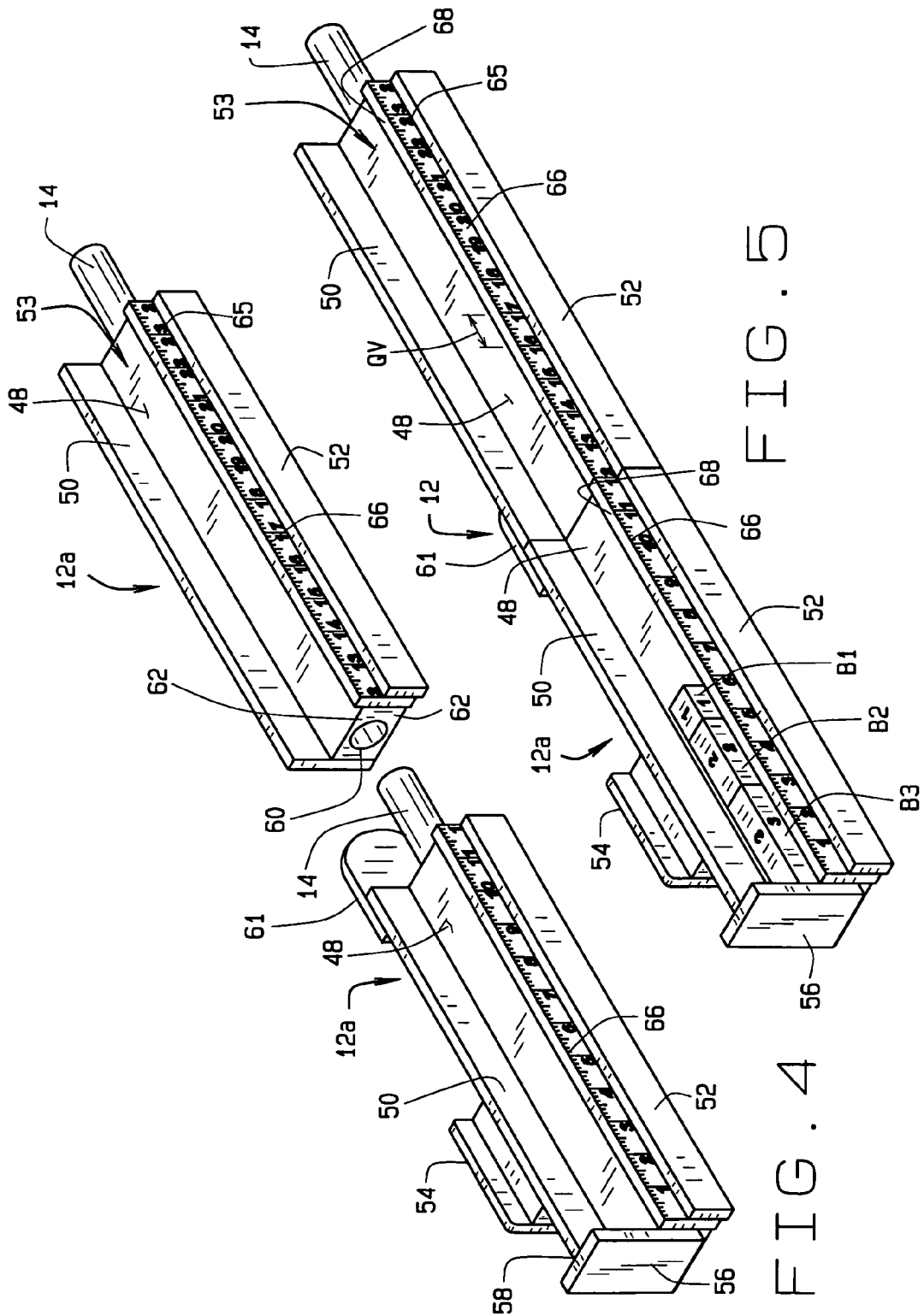

VISUAL ARITHMETIC TEACHING DEVICE

CROSS-REFERENCE TO RELATED APPLICATIONS

Not Applicable.

STATEMENT REGARDING FEDERALLY SPONSORED RESEARCH

Not Applicable.

BACKGROUND OF THE DISCLOSURE

The present disclosure relates to an educational device that teaches mathematical functions, in particular, the present disclosure relates to an educational tool that teaches mathematical functions such as addition, subtraction, multiplication and division via a "hands-on" use by students.

Currently students, and in particular, elementary school age children, learn arithmetic by memorizing the "facts" of addition, subtraction, multiplication and division. The students then practice their arithmetic to help "drill" in the "facts". However, not all children learn well this way. Rather, many children are visual learners. It would thus be beneficial to provide a device which can be used by children to visualize arithmetic problems, and, which will hopefully be fun for the children to use.

BRIEF SUMMARY OF THE DISCLOSURE

The present disclosure relates to an educational device that teaches arithmetic functions. The educational device comprises a track which can be made from a plurality of track members. Each track member comprises spaced apart side walls and a floor which, in combination, define a channel which can extend the length the track member. A stop is placed at at least one end of the channel. The educational device further comprises a plurality of mating projections and openings. The projections and openings are positioned on the track members or are sized and shaped such that the track members can only be assembled in one manner. Additionally, the track comprises stiffeners, and the positioning of the stiffeners on the various track members can be used to determine the order in which the track members are connected together.

The educational device also comprises a scale comprised of unit markings placed along an outer surface of one of the track side walls. The unit markings are spaced apart by a unit length. The educational device also includes a plurality of blocks which are sized to be slidingly received in the track channel—that is, the blocks have a width that is slightly less than the width of the channel. The blocks are provided in multiple lengths, each block having a length that corresponds to a multiple of the unit length. The blocks can be marked with a number indicating the length in units of the particular block. When, the blocks, are placed in the channel, they line up with a unit markings on the scale, thereby showing the total length in "units" of the blocks placed in the channel. This then shows the sum of the lengths of the different blocks.

The present disclosure also relates to method of teaching arithmetic. The method comprises placing a selected set of the blocks in the channel. By viewing where total unit length of the blocks placed in the channel, the student can visualize the sum of the lengths of each of the blocks. Similarly, by removing a block from the channel, the student can then visualize the subtraction of the total length of the blocks first placed in the channel less the length of the block removed from the channel.

BRIEF DESCRIPTION OF THE SEVERAL VIEWS OF THE DRAWINGS

In the accompanying drawings which form part of the specification:

FIG. 4 is a perspective view of two track members aligned to be connected;

FIG. 5 is a front perspective view of the two track members when connected, with a plurality of blocks received in the track channel;

Corresponding reference numerals indicate corresponding parts throughout the several figures of the drawings.

DESCRIPTION OF THE PREFERRED EMBODIMENT

The following detailed description illustrates the visual arithmetic teaching device by way of example and not by way of limitation. The description clearly enables one skilled in the art to make and use the visual arithmetic teaching device, describes several embodiments, adaptations, variations, alternatives, and uses of the visual arithmetic teaching device, including what is presently believed to be the best mode of carrying out the invention.

Figure 1:
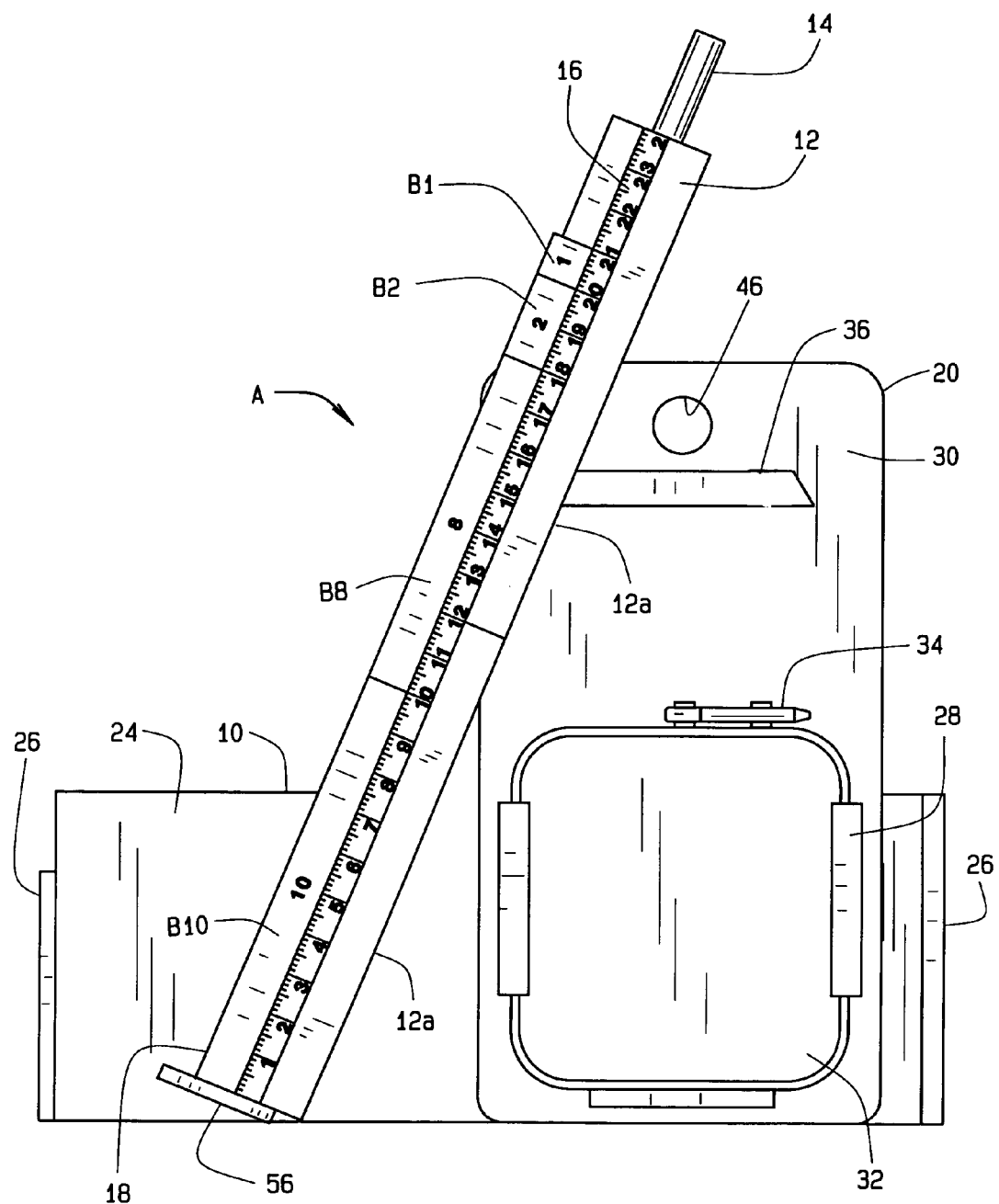
FIG. 1 is front elevational view of the present disclosure illustrating a container, track and blocks constructed in accordance with and embodying the present disclosure.

Referring to the drawings, an educational device A in the form of an educational tool is shown generally in FIG. 1. The educational device A teaches physical representation of quantitative measurements for the students to learn, via a "hands on" experience, arithmetic functions such as addition and subtraction. The educational device A can also be used to teach simple multiplication and division. The educational device A comprises a container 10, a track 12 and a plurality of blocks 18. The components of the educational device A can be made from any desired material. For example, the components can be made from wood or plastic. Further, some components can be made from one material and other components can be made from other materials.

Figure 2:
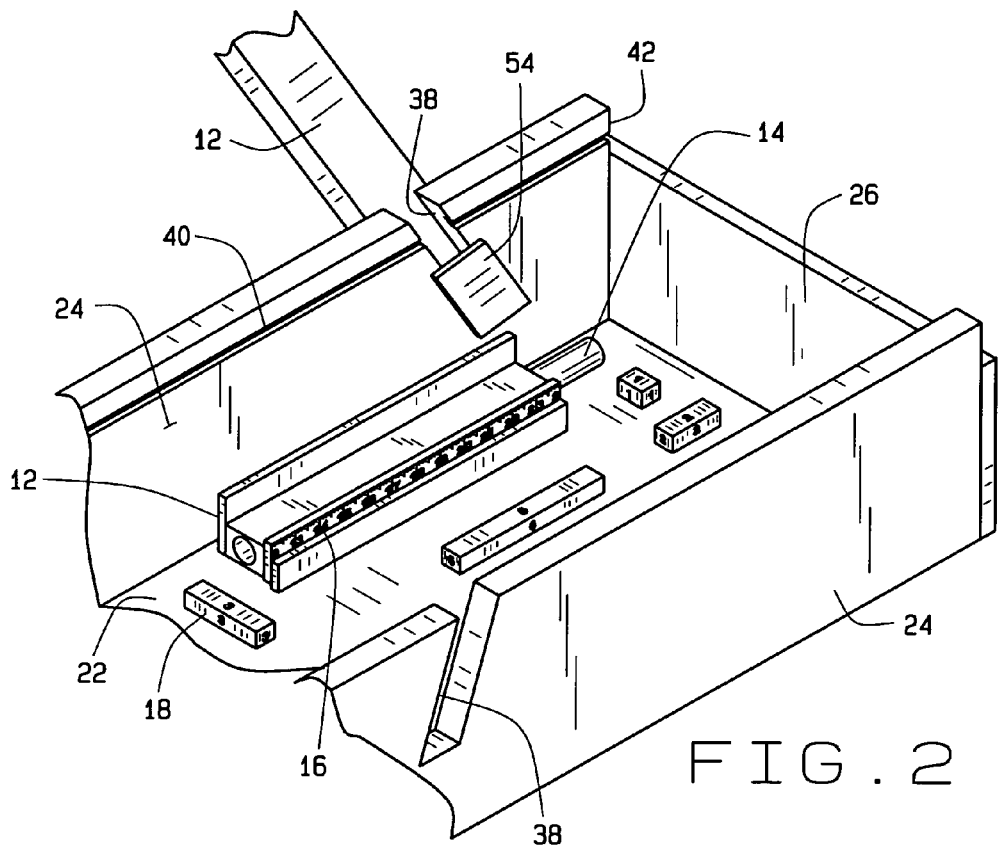
FIG. 2 is a partial perspective view of the container illustrating slots positioned on the container sides and illustrating the container interior.

The container 10 includes a cover 20, a floor 22 (FIG. 2), a first pair of opposing sides walls 24 and a pair of opposing end walls 26. A slot 38 (FIG. 2) is formed in at least one of the side walls 24 of the container 10. As shown, each side wall 24 is provided with a slot 38, and the slots 38 extend diagonally from the top of the side walls 24 toward the bottom of the side walls 24. The slots 38 are shown to extend in opposite directions, but could extend in the same direction. The slots 38 are sized and shaped such that any of the components contained within the interior of the container 10 cannot pass through the slots 38. Accordingly, the components have dimensions that are greater than the size and shape of the slots 38.

The side walls 24 include grooves 40 spaced below the top of the side walls. The grooves 40 in the opposed side walls are generally parallel to each other and generally co-planar with each other. The back end wall has a height generally equal to the height of the side walls, and the front end wall has a height less than the height of the side wall. Thus, the front end wall defines an opening 42 which exposes the grooves 40, and the back end wall defines a closed end 44.

Figure 3:
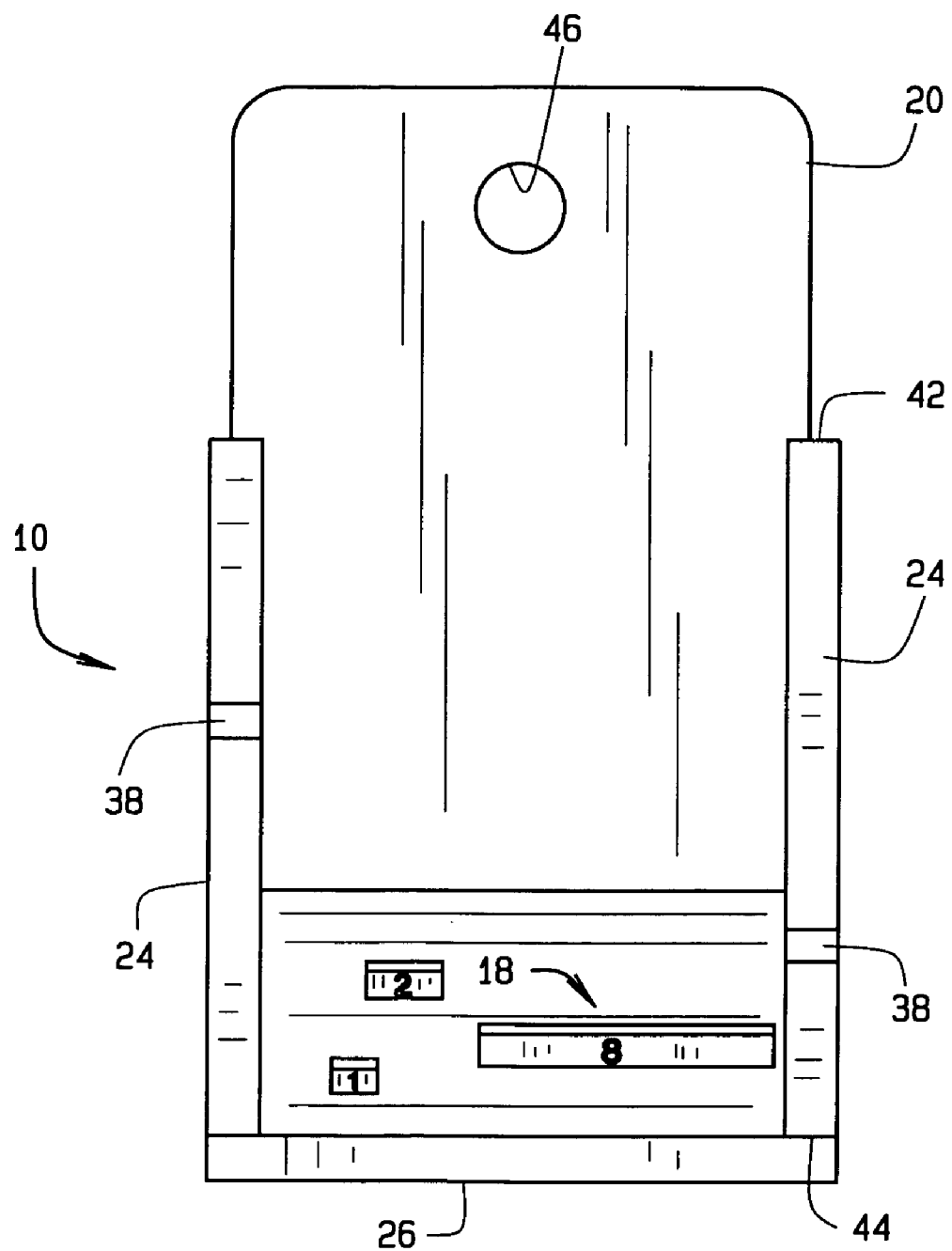
FIG. 3 is a plan view of a container top or cover sliding within the container sides to cover the container interior that is configured to hold blocks and the track members which make up the track.

Referring to FIG. 3, the grooves 40 are sized to slidingly receive the cover 20. The container cover 20 can be passed through the opening 42 in the front end wall of the container and slide along grooves 40 to close the container. As can be appreciated, the back wall or closed end 44 of the container will prevent the cover 20 from sliding all the way through the grooves 40 and exiting out the back end of the container. The cover 20 also includes a handle 46 (i.e., in the form an opening) to assist in sliding the cover 20 in and out of the grooves 40. The cover 20 slides within the grooves 40, as noted, to allow access to the contents of the container when in use and to contain a writing surface 32, writing implement 34, track members 12a, and blocks 18 within the interior of the container 10 when the educational device A is not in use.

The cover 20 includes brackets 28 (FIG. 1) on one side or surface 30 thereof. The brackets 28 are adapted to hold a writing surface 32 such as a piece of paper, a paper pad, a dry erase board, or a chalkboard, for example. As shown in FIG. 1, a writing implement 34 is also provided. The writing surface 32 can be provided with a frame having its own bracket which will hold the writing implement 34. As can be appreciated, the writing implement 34 will be of a type which can be used with the type of writing surface 32. Hence, the writing implement, for example, can be a pencil, pen, crayon, erasable marker, or chalk. Further, as shown, the side 30 of the cover 20 includes a support 36 which extends or protrudes from the cover side 30.

The track 12 can be formed as a one piece track, or can be comprised of a plurality of track members 12a. The track 12 (and hence each track member 12a) has a floor 48 positioned between opposed and generally parallel sides 50, 52 to define a channel 53. At one end, the track includes a key 54 extending from the side 50 and a stop 56 which closes the channel 53. The key 54 is generally T-shaped, and is sized to be received in the container slot 38, so that the track can be mounted to the container, for example, as seen in FIG. 1. As seen in FIG. 1, the container slot 38 positions the track on a diagonal in a vertical plane parallel to the plane of the side wall 24. The track 12 can be sufficiently strong to be self supporting when mounted in the container. However, the cover 20 can be positioned adjacent the side wall 24 in which the track 12 is mounted such that the track 12 rests on the support 36. As seen, the support 36 is shown to be generally trapezoidal in shape, with an angle corresponding to the angle of the track when received in the slot 38, such that the track rests along the sloped edge of the support 36. However, the support 36 could be of any desired shape, to provide at least a point of contact with the track 12.

A scale 16 printed is on an outer surface 66 of the track to be visible during use. The scale 16 is shown to be printed on the outer surface 66 of the track wall 52, but could also be printed on an upper surface of the track wall 52. The scale 16 can be printed directly on the track wall 52. Alternatively, the scale 16 can be printed on a separate member which is then received in a groove in the track wall. In this variation the scale would be removable from the track. The scale is provided with unit markings 65 which are spaced apart by a unit length. If desired, intermediate unit markings can be provided to show fractional units, such as ½ unit, ¼ unit, ¾ unit, etc. The unit length can be any desired length, and need not be limited to inches, centimeters or any other standard unit of measure.

The track 12 can be assembled from a plurality of track members 12a, as is shown in the Figures, which can then be connected together to form the track 12. Providing track members 12a allows for a track which, when assembled, is longer than the container 10, but which can be disassembled and all the track members 12a can be stored in the container 10. The track members include opposed end surfaces 62 having projections 14 and openings 60. The opening 60 of one track member 12a is sized to receive the projection 14 of an adjacent track member 12a. The bottom (or first) track member 12a which includes the channel stop 56 need not be provided with the projection or opening at the bottom (stop) end of the track member. Similarly, the last (or end) track member does not need to be provided with a projection or opening at the end of the track channel 53 opposite the stop 56. The track 12 also includes stiffeners 61 at the ends of at least some of the track members 12a. The stiffeners 61, as seen in FIGS. 4 and 5, are fixed to the back wall 50 of the track member 12a and extend beyond the end of the track member 12a. The stiffener 61 thus spans the junction between adjacent track members 12a as seen in FIG. 5. The use of the stiffeners 61 prevents the track members 12a from rotating relative to each other when connected. Additionally, the stiffeners 61 add rigidity to the assembled track 12.

Figure 8:
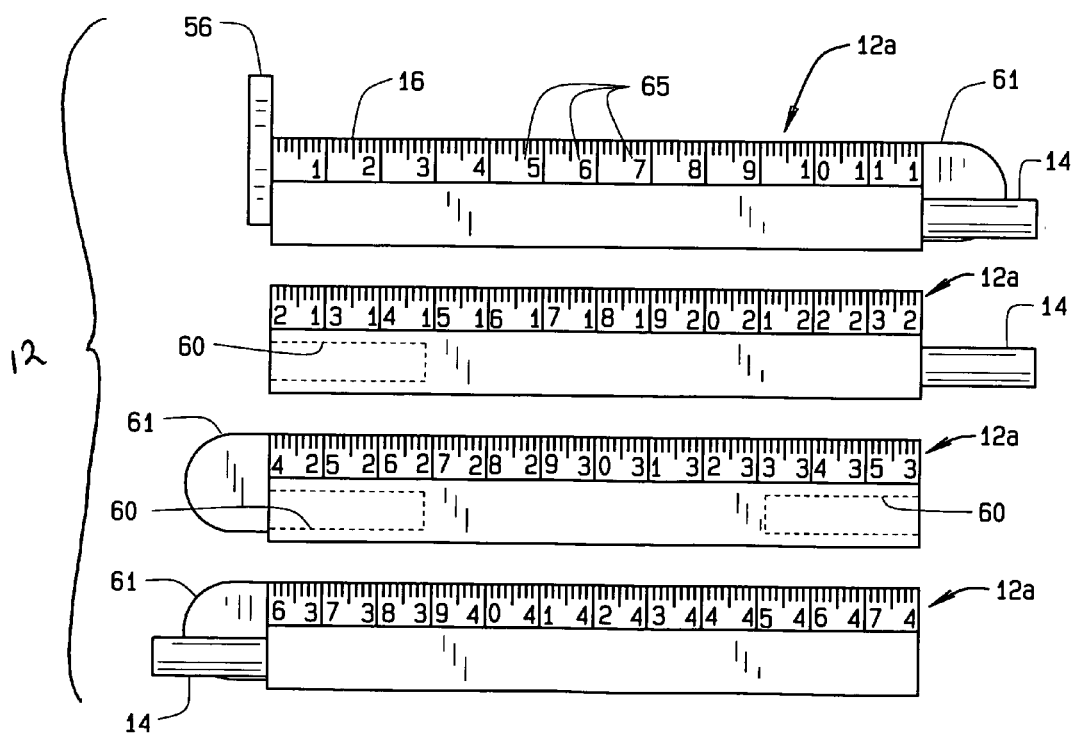
FIG. 8 is a plan view of the track members.

Each of the plurality of projections 14 (FIG. 4) is sized and shaped to be removably received with the opening 60 of a track member 12a to connect the separate track members 12a together to form the track 12 (FIG. 5). The projections 14, openings 60, and stiffeners 61 are positioned on the track members such that the track members can only be connected in one configuration, so that the scale markings 65 will be consecutive. Thus, as seen in FIG. 8, a track member can be provided with both a projection 14 and an opening 60 or two openings 60 and no projection. Although not shown, a track member could also be provided with two projections and no opening. In the example shown, the projections 14 are all the same size, and hence the openings 60 are all the same size. Hence, in this embodiment, the positioning of the stiffeners, projections and openings defines the manner in which the track members are connected. For example, the first and third track members in FIG. 8 cannot be connected because the first track member has a stiffener at its right end and the third has a stiffener at its left end. Similarly, the first and fourth track members cannot be connected because of the placement of both the projections 14 and the stiffeners 61.

Alternatively, the projections 14 and openings 60 can be shaped and/or sized such that a particular projection 14 can only be received in a particular opening 60, such that the track members can be connected in only one predetermined sequence. Hence, although the projections 14 and openings 60 are both shown to be round, they could be provided in other shapes as well. In fact, one track member could have a square projection, another track member could have a round projection, etc.

When the scale 16 is printed on the track member walls 52, this predetermined sequence will place the scale units in numerical order. If the scale 16 is provided as a separate element of the educational device A which is removably received in a track groove, then all the projections 14 can be the same and all the openings can be the same to allow the track members to be assembled in any desired manner. In this variation, the scale member would be installed in the track groove after the track has been assembled.

Figure 6:
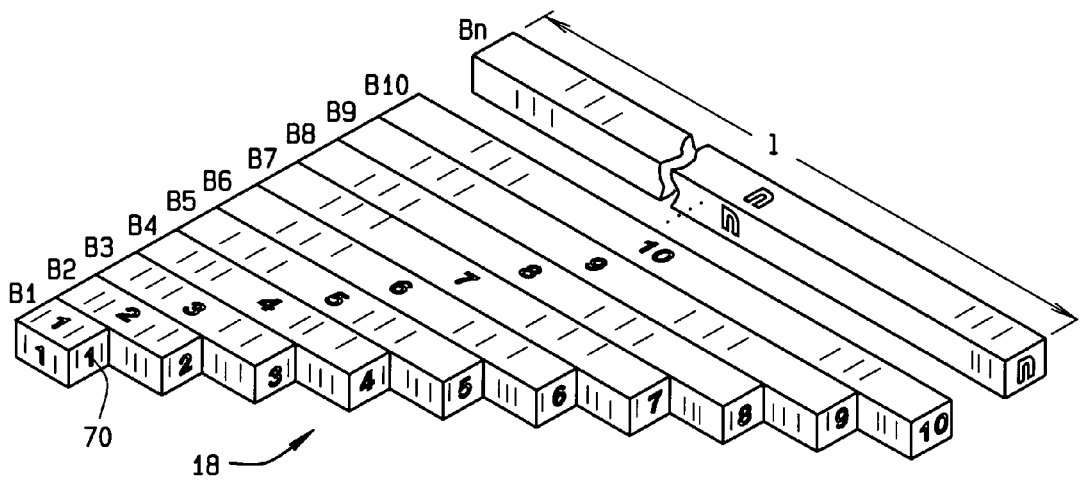
FIG. 6 is a perspective view of an embodiment of the blocks.

Referring to FIG. 6, each block of the plurality of blocks 18 has a length that corresponds to a multiple of the unit length. Preferably, the multiple is a whole number, such that the block length is equal to one unit, two units, three units, etc. If desired blocks can be provided with lengths that are not whole number multiples of the unit length. Hence, the block can be one-quarter of a unit length, one and one-half unit lengths, two and three-quarter unit lengths, etc. As will be discussed below, providing blocks with fractional unit lengths allows for teaching the addition and subtraction of fractional units as well as whole units. The blocks 18 are sized to be removeably received in the track channel 53. Hence, each block 18 has a width that is at most slightly less than the width of the track channel. When a set of the blocks 18 are placed in the track 12 and against the track wall 50, the length (or combined length for two or more blocks 18) will line up with a unit marking 65 (FIG. 5).

Returning to FIG. 6, each block 18 may include an indicia 70 positioned on the block 18. In one embodiment, the indicia 70 comprise numerals that represent the length l of the block 18 in unit numbers or unit lengths. As shown, the blocks 18 comprise block B1 (indicia "1"), block B2 (indicia "2") . . . block $B_n$ (indicia "n"). Thus, block B1 may have a length of one unit; block B2 has a length of two (2) units, block B3 has a length of three (3) units, etc. If the blocks are provided in fractional units, then, for example, the indicia 70 of one block could be "1½" representing a block that is one and one-half units in length.

During use, the student places any combination of blocks 18 in the track channel 53. The plurality of blocks 18 can include several blocks of each of the different lengths. Thus, several blocks B1 can be provided, several blocks B2 can be provided, several blocks B3 can be provided, etc, so that, during use, the user can select a desired number of any of the block lengths. As shown in FIG. 5, block B3 (length of three (3) units), block B2 (length of two (2) units) and block B1 (length of one (1) unit) when placed in the channel 53 with one of the blocks against the stop 56, and the three blocks abutting each other, line up with the indicia 65 representing six (6) units on the scale 16. Hence, the student can visually see that 3+2+1=6 by reading the scale 16. These particular blocks 18 can be arranged in a different order (i.e., block B2, block B1 and block B3) to show that the lengths of these particular blocks 18 still add up to the value of six (6) units. As shown in FIG. 5, the unit marks 65 can display fractional unit lengths. Accordingly, the blocks 18 may correspond to addition and subtraction of fractional lengths to teach older students fractional units in a physical way and visual way.

Figure 7:
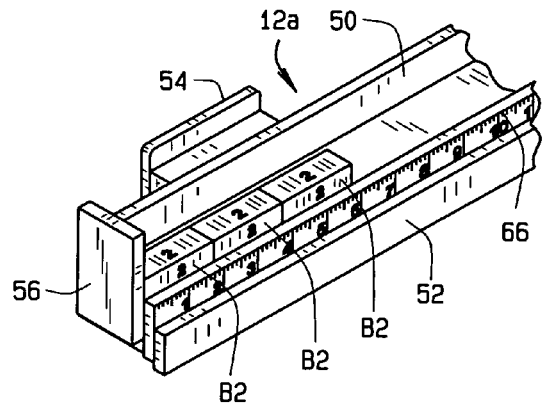
FIG. 7 is a fragmentary view showing how the device can be used to demonstrate multiplication and division.

Regardless of the combination of the blocks 18 chosen to be placed in the track channel 53, the length of the blocks 18 will line up with a unit mark 65 on the track 12. For example, FIG. 1 shows the combination of blocks B10, B8, B2 and B1 having lengths of ten (10) units, eight (8) units, two (2) units and one (1) unit respectively. The sum of the lengths for blocks B10, B8, B2 and B1 is illustrated by the unit markings 65 of twenty-one (21) units as noted on the scale 16. Accordingly, the educational device A of the present disclosure allows the student to manipulate the blocks 18 with respect to the quantitative value QV denoted on the scale 16 to physically illustrate the arithmetic function of addition. In another example, the combination of blocks B10, B8, B2, and B1 may be positioned on the track 12 wherein the student removes block B1 to illustrate the subtraction of one (1) from twenty-one (21) resulting in twenty (20) would be noted on the scale 16. Accordingly, the educational device A of the present disclosure allows the students to manipulate the blocks 18 to physically illustrate the arithmetic function of subtraction to the students. In other examples, the student may add and/or remove multiple blocks 18 to illustrate multiplication and division. For example, as shown in FIG. 7, three (3) blocks B2 each being two (2) units in length can be placed on the track 12 to demonstrate that 3×2=6. By way of multiplication and division fact families, this will similarly show that two goes into six three times, and hence that six divided by two equals three (6÷2=3) and that six divided by three equal two (6÷3=2).

With the track 12 mounted in the container slot 38, as seen in FIG. 1, the blocks 18 will slide under the force of gravity to the stop 56, which is at the beginning of the channel 53. The track can also be used when lying on a flat surface (such as a table top). However, in this instance, the blocks will have to be pushed to the beginning of the track. As shown, the supported track 12 angles over the writing surface 32 to present a fully working environment for the student. In this way, the mathematical problem presented by the blocks (10+8+2+1 in FIG. 1) can also be written on the surface 32.

Returning to FIG. 1 and referring to FIGS. 2-6, the cover 20 of the container 10 in the closed position keeps the components contained within the interior space. A student or teacher slides the cover 20 of the container 10 to expose the interior. Then the student or teacher may assemble the track members 12a to form the track 12. As noted, the track can be mounted in one of the container side walls 24 or used flat. The student then places any combination of blocks 18 in the track channel 53 with the first block 18 resting against the stop 56. The stop 56 keeps the blocks 18 from sliding off an end of the track 12 and also acts as a starting point for the placement of the block lengths to ensure that that scale will be properly read.

As various changes could be made in the above constructions without departing from the scope of the invention as set forth in the claims, it is intended that all matter contained in the above description or shown in the accompanying drawings shall be interpreted as illustrative and not in a limiting sense. The slots 38 need not extend completely through the container walls 24. In such a variation, the slots 38 would be formed complementary to the track key 54, and the slot and the key would be shaped to prevent the track from being removed laterally from the slots. Thus, the track key 54 could be formed in any shape comprising a narrower portion and a wider portion. Hence, the track key can be T-shaped, generally triangular or trapezoidal, or bulbous. Other means can be used to connect the track members 12a together. Although the slots 38 are shown to be in the side walls 24, the slots 38 could alternatively be formed in the end walls 26. Although the track is disclosed to include a channel, the track could instead include a rail or rib, and the blocks could include a groove which is received over the track rail. These examples are merely illustrative.

The invention claimed is:

1. An educational device that teaches arithmetic, comprising:
    a track comprised of two or more track members; the track members being configured to be the assembled together in only one configuration;
    the track being provided with stiffeners; said stiffeners being mounted on a back wall of at least one of said track members; said stiffeners further defining the order in which said track members can be connected together;
    a scale positioned on one of the sides of the track to be visible during use of the educational device, the scale being comprised of a plurality of unit markings evenly spaced along the scale; the distance between each unit marking defining a unit length or a fractional unit length; and a plurality of blocks, each block having a length that corresponds to a multiple of the unit length, the blocks being slidable along the track.

2. The educational device of claim 1 wherein said multiple is an integer number.

3. The educational device of claim 1 wherein the track comprises of a floor and opposed sides defining a channel, the blocks having a width such that the blocks can be removably received in the channel.

4. The educational device of claim 1 wherein the track includes a stop at one end thereof.

5. The educational device of claim 1 wherein each block includes an indicia representative of the length of the block.

6. The educational device of claim 5 wherein each indicia comprises a numeral.

7. The educational device of claim 1 wherein the track includes a key extending from one of the sides of the track.

8. An educational device that teaches arithmetic, comprising:

a track comprising front, back and bottom surfaces to define a channel, and a key protruding from one of the surfaces of the track; a scale positioned on one of the track surfaces to be visible during use of the educational device, the scale being comprised of a plurality of unit markings evenly spaced along the scale; the distance between each unit marking defining a unit length or a fractional unit length;

a plurality of blocks, each block having a length that corresponds to a multiple of the unit length, the blocks being sized to be slidably received in the track channel; and a container having a first set of opposing walls, a second set of opposing walls and a floor to define a volume sized to receive said track and said blocks; said container further including a cover separate from said track to close said volume, at least one slot in at least one of said walls, said slot extending downwardly from a top of said wall; said track key being sized and shaped to be removably received in a single one of said at least one slot to support said track adjacent said container wall such that said track is in a generally vertical plane parallel to a plane of said wall having said at least one slot.

9. The educational device of claim 8 wherein the track is comprised of two or more track members; the track members being adapted to be assembled together to form said track.

10. The educational device of claim 9 wherein the track members are adaptable to be the assembled together in only one configuration.

11. The educational device of claim 10 wherein the track members each include at least one projection at an end of said track member or at least one slot at an end of said track member; the projections and slots being arranged on the various track members such that the track members can be connected together in only a single configuration.

12. The educational device of claim 8 wherein said cover is positionable adjacent said container; said cover comprising a support projecting from a surface of said cover against which said track rests when the at least one slot and key are engaged and said track is positioned adjacent said wall of said container with said at least one slot.

13. An educational device that teaches a physical representation of arithmetic, comprising:

a container having a cover, a floor, a pair of opposing side walls and a pair of opposing end walls, said side and end walls being generally vertical;

a track separate from said container cover; said track comprising a floor and side walls defining a track channel;

a scale positioned on the track to be visible during use of the educational device, the scale comprising a plurality of unit markings evenly spaced apart by a desired length, said length defining a unit length;

a plurality of blocks, the blocks each having a length of "n" units and a width such that the blocks can be slidingly received in the track channel; and at least one slot formed in at least one of the walls of the container; said at least one slot extending downwardly from a top of said wall; and wherein said track includes a key near one end thereof; said key being sized and shaped to be removably received in said at least one slot to mount said track to said container against a single wall of the container; whereby, when said track is mounted to said container, said track is positioned in a generally vertical plane parallel to the vertical plane of said wall in which the slot is formed and adjacent said wall.

14. The educational device of claim 13 wherein the plurality of blocks includes blocks of varying lengths.

15. The educational device of claim 13 wherein "n" is an integer equal to or greater than 1.

16. The educational device of claim 13 wherein the cover, the floor, the of opposing side walls and the opposing end walls define an interior of the container; the interior being sized and shaped to contain the track and the plurality of blocks.

17. The educational device of claim 13 wherein each block includes an indicia representative of the length of the block in units.

18. The educational device of claim 13 wherein said cover includes a track support projecting from a surface thereof; said cover being positionable adjacent said container such that said track lies against said track support.

19. The educational device of claim 18 wherein said track support has a sloped edge, the angle of said sloped edge corresponding to the angle of said track, such that said track engages said sloped edge of said track support substantially along the length of said track support sloped edge.

20. The educational device of claim 13 wherein said track is comprised of a plurality of track members; said track members being adapted to be connected together to form said track.

21. The educational device of claim 20 wherein said track members can be assembled in only one predetermined order.

22. The educational device of claim 20 wherein the track members each include at least one projection at an end of said track member or at least one slot at an end of said track member; the projections and slots being arranged on the various track members such that the track members can be connected together in only a single configuration.

23. An educational device that teaches a physical representation of arithmetic, comprising:

a container having a cover, a floor, a pair of opposing side walls and a pair of opposing end walls;

a track comprising a plurality of track members adapted to be connected together to form said track; said track comprising a floor and side walls defining a track channel; said track members each including at least one projection at an end of said track member or at least one slot at an end of said track member; the projections and slots being arranged on the various track members such that the track members can be connected together in only a single configuration;

the track being provided with stiffeners; said stiffeners being mounted on a back wall of at least one of said track members; said stiffeners further defining the order in which said track members can be connected together;

a scale positioned on the track to be visible during use of the educational device, the scale comprising a plurality of unit markings evenly spaced apart by a desired length, said length defining a unit length; and a plurality blocks, the blocks each having a width such that the blocks can be slidingly received in the track channel.

* * * * *